United States Patent
Tse

(10) Patent No.: US 10,402,656 B1
(45) Date of Patent: Sep. 3, 2019

(54) SYSTEMS AND METHODS FOR ACCELERATING VIDEO ANALYSIS

(71) Applicant: GoPro, Inc., San Mateo, CA (US)

(72) Inventor: Daniel Tse, San Mateo, CA (US)

(73) Assignee: GoPro, Inc., San Mateo, CA (US)

( * ) Notice: Subject to any disclaimer, the term of this patent is extended or adjusted under 35 U.S.C. 154(b) by 74 days.

(21) Appl. No.: 15/649,509

(22) Filed: Jul. 13, 2017

(51) Int. Cl.
*G06K 9/00* (2006.01)
*G06K 9/62* (2006.01)
*H04N 19/10* (2014.01)

(52) U.S. Cl.
CPC ....... *G06K 9/00718* (2013.01); *G06K 9/6215* (2013.01)

(58) Field of Classification Search
CPC .......... G06K 9/00718; G06K 9/00724; G06K 9/00711; G06K 9/00731; G06K 2009/00738; G06K 9/00744; G06K 9/00751; G06K 9/00758; G06K 9/00765; G06K 9/00771; G06K 9/62
USPC .................. 382/224–229, 168–172; 715/723
See application file for complete search history.

(56) References Cited

U.S. PATENT DOCUMENTS

| | | | |
|---|---|---|---|
| 7,222,356 B1 | 5/2007 | Yonezawa |
| 7,483,618 B1 | 1/2009 | Edwards |
| 7,681,223 B2 | 3/2010 | Takahashi |
| 8,446,433 B1 | 5/2013 | Mallet |
| 8,611,422 B1 | 12/2013 | Yagnik |
| 8,718,447 B2 | 5/2014 | Yang |
| 8,763,023 B1 | 6/2014 | Goetz |
| 9,077,956 B1 | 7/2015 | Morgan |
| 9,253,533 B1 | 2/2016 | Morgan |
| 2004/0128317 A1 | 7/2004 | Sull |
| 2005/0025454 A1 | 2/2005 | Nakamura |
| 2005/0060365 A1 | 3/2005 | Robinson |
| 2006/0156219 A1 | 7/2006 | Haot |
| 2007/0002946 A1 | 1/2007 | Bouton |
| 2007/0106419 A1 | 5/2007 | Rachamadugu |

(Continued)

FOREIGN PATENT DOCUMENTS

WO 2009040538 4/2009

OTHER PUBLICATIONS

FFmpeg, "Demuxing," Doxygen, Dec. 5, 2014, 15 Pages, [online] [retrieved on Jul. 13, 2015] Retrieved from the internet <URL:https://www.ffmpeg.org/doxygen/2.3/group_lavf_encoding.html>.

(Continued)

*Primary Examiner* — Dwayne D Bost
*Assistant Examiner* — Stephen M Brinich
(74) *Attorney, Agent, or Firm* — Esplin & Associates, PC

(57) ABSTRACT

Video information defining video content may be accessed. The video content may include video frames. The video frames may be grouped into similarity groups based on similarity of the video frames. The similarity groups may include a first similarity group including a first video frame and a second video frame. The first video frame may be similar to the second video frame. Representative video frames may be selected from the similarity groups. An individual representative video frame may correspond to an individual similarity group. Representative video frames may include a first representative video frame selected from and corresponding to the first similarity group. The video content may be analyzed based on the representative video frames.

20 Claims, 4 Drawing Sheets

(56) References Cited

U.S. PATENT DOCUMENTS

| | | |
|---|---|---|
| 2007/0168543 A1 | 7/2007 | Krikorian |
| 2007/0204310 A1 | 8/2007 | Hua |
| 2007/0230461 A1 | 10/2007 | Singh |
| 2008/0044155 A1 | 2/2008 | Kuspa |
| 2008/0123976 A1 | 5/2008 | Coombs |
| 2008/0152297 A1 | 6/2008 | Ubillos |
| 2008/0163283 A1 | 7/2008 | Tan |
| 2008/0177706 A1 | 7/2008 | Yuen |
| 2008/0253735 A1 | 10/2008 | Kuspa |
| 2008/0313541 A1 | 12/2008 | Shafton |
| 2009/0213270 A1 | 8/2009 | Ismert |
| 2010/0086216 A1 | 4/2010 | Lee |
| 2010/0104261 A1 | 4/2010 | Liu |
| 2010/0183280 A1 | 7/2010 | Beauregard |
| 2010/0231730 A1 | 9/2010 | Ichikawa |
| 2010/0245626 A1 | 9/2010 | Woycechowsky |
| 2010/0251295 A1 | 9/2010 | Amento |
| 2010/0278504 A1 | 11/2010 | Lyons |
| 2010/0278509 A1 | 11/2010 | Nagano |
| 2010/0281375 A1 | 11/2010 | Pendergast |
| 2010/0281386 A1 | 11/2010 | Lyons |
| 2010/0318660 A1 | 12/2010 | Balsubramanian |
| 2011/0075990 A1 | 3/2011 | Eyer |
| 2011/0093605 A1 | 4/2011 | Choudhury |
| 2011/0093798 A1 | 4/2011 | Shahraray |
| 2011/0206351 A1 | 8/2011 | Givoly |
| 2011/0293250 A1 | 12/2011 | Deever |
| 2012/0027381 A1 | 2/2012 | Kataoka |
| 2012/0030029 A1 | 2/2012 | Flinn |
| 2012/0057852 A1 | 3/2012 | Devleeschouwer |
| 2012/0123780 A1 | 5/2012 | Gao |
| 2012/0192225 A1 | 7/2012 | Harwell |
| 2012/0198319 A1 | 8/2012 | Agnoli |
| 2012/0311448 A1 | 12/2012 | Achour |
| 2013/0041948 A1 | 2/2013 | Tseng |
| 2013/0104177 A1 | 4/2013 | Kwan |
| 2013/0136193 A1 | 5/2013 | Hwang |
| 2013/0151970 A1 | 6/2013 | Achour |
| 2013/0166303 A1 | 6/2013 | Chang |
| 2013/0185388 A1 | 7/2013 | Mackie |
| 2013/0195429 A1 | 8/2013 | Fay |
| 2013/0197967 A1 | 8/2013 | Pinto |
| 2013/0208942 A1 | 8/2013 | Davis |
| 2013/0222583 A1 | 8/2013 | Earnshaw |
| 2013/0259399 A1 | 10/2013 | Ho |
| 2013/0283301 A1 | 10/2013 | Avedissian |
| 2013/0287214 A1 | 10/2013 | Resch |
| 2013/0300939 A1 | 11/2013 | Chou |
| 2013/0318443 A1 | 11/2013 | Bachman |
| 2013/0343071 A1 | 12/2013 | Rav-Acha |
| 2014/0072285 A1 | 3/2014 | Shynar |
| 2014/0093164 A1 | 4/2014 | Noorkami |
| 2014/0096002 A1 | 4/2014 | Dey |
| 2014/0105573 A1 | 4/2014 | Hanckmann |
| 2014/0161351 A1 | 6/2014 | Yagnik |
| 2014/0165119 A1 | 6/2014 | Liu |
| 2014/0169766 A1 | 6/2014 | Yu |
| 2014/0212107 A1 | 7/2014 | Saint-Jean |
| 2014/0219634 A1 | 8/2014 | David McIntosh |
| 2014/0226953 A1 | 8/2014 | Hou |
| 2014/0232818 A1 | 8/2014 | Carr |
| 2014/0245336 A1 | 8/2014 | Lewis, II |
| 2014/0270537 A1* | 9/2014 | Lo .......................... G06T 11/60 |
| | | 382/195 |
| 2014/0300644 A1 | 10/2014 | Gillard |
| 2014/0328570 A1 | 11/2014 | Cheng |
| 2014/0341527 A1 | 11/2014 | Hurley |
| 2014/0341528 A1 | 11/2014 | Mahate |
| 2014/0366052 A1 | 12/2014 | Ives |
| 2015/0015680 A1 | 1/2015 | Wang |
| 2015/0022355 A1 | 1/2015 | Pham |
| 2015/0029089 A1 | 1/2015 | Kim |
| 2015/0186073 A1 | 7/2015 | Pacurariu |
| 2015/0281710 A1 | 10/2015 | Sievert |
| 2015/0287435 A1 | 10/2015 | Land |
| 2015/0318020 A1 | 11/2015 | Pribula |
| 2015/0375117 A1 | 12/2015 | Thompson |
| 2015/0382083 A1 | 12/2015 | Chen |
| 2016/0005440 A1 | 1/2016 | Gower |
| 2016/0026874 A1 | 1/2016 | Hodulik |
| 2016/0027470 A1 | 1/2016 | Newman |
| 2016/0027475 A1 | 1/2016 | Hodulik |
| 2016/0029105 A1 | 1/2016 | Newman |
| 2016/0055885 A1 | 2/2016 | Hodulik |
| 2016/0188997 A1* | 6/2016 | Desnoyer .................. G06T 7/55 |
| | | 382/190 |
| 2016/0225405 A1 | 8/2016 | Matias |
| 2016/0225410 A1 | 8/2016 | Lee |
| 2016/0234345 A1 | 8/2016 | Roberts |
| 2016/0300594 A1 | 10/2016 | Allen |
| 2016/0358603 A1 | 12/2016 | Azam |
| 2016/0366330 A1 | 12/2016 | Boliek |
| 2017/0091561 A1* | 3/2017 | Pham ................. G06K 9/00288 |
| 2018/0276478 A1* | 9/2018 | Cunico .............. G06K 9/00751 |

OTHER PUBLICATIONS

PCT International Search Report and Written Opinion for PCT/US2015/023680, dated Oct. 6, 2015, 13 pages.

PCT International Written Opinion for PCT/US2015/041624, dated Dec. 17, 2015, 7 Pages.

PCT International Search Report for PCT/US15/41624 dated Nov. 4, 2015, 5 pages.

PCT International Search Report for PCT/US15/23680 dated Aug. 3, 2015, 4 pages.

PCT International Preliminary Report on Patentability for PCT/US2015/023680, dated Oct. 4, 2016, 10 pages.

PCT International Search Report and Written Opinion for PCT/US15/12086 dated Mar. 17, 2016, 20 pages.

FFmpeg, "Muxing," Doxygen, Jul. 20, 2014, 9 Pages, [online] [retrieved on Jul. 13, 2015] Retrieved from the internet <URL: https://www.ffmpeg.org/doxyg en/2. 3/structA VP a ck et. html>.

FFmpeg, "AVPacket Struct Reference," Doxygen, Jul. 20, 2014, 24 Pages, [online] [retrieved on Jul. 13, 2015] Retrieved from the internet <URL:https://www.ffmpeg.org/doxygen/2.5/group_lavf_decoding.html>.

Iandola et al., "SqueezeNet: AlexNet-level accuracy with 50x fewer parameters and <0.5MB model size", arXiv:1602.07360v3 [cs.Cv] Apr. 6, 2016 (9 pgs.).

Yang et al., "Unsupervised Extraction of Video Highlights Via Robust Recurrent Auto-encoders" arXiv:1510.01442v1 [cs.Cv] Oct. 6, 2015 (9 pgs).

Tran et al., "Learning Spatiotemporal Features with 3D Convolutional Networks", arXiv:1412.0767 [cs.CV] Dec. 2, 2014 (9 pgs).

Schroff et al., "FaceNet: A Unified Embedding for Face Recognition and Clustering," IEEE Conference on Computer Vision and Pattern Recognition (CVPR), 2016, 10 pgs.

Parkhi et al., "Deep Face Recognition," Proceedings of the British Machine Vision, 2015, 12 pgs.

Iandola et al., "SqueezeNet: AlexNet-level accuracy with 50x fewer parameters and <0.5MB model size," arXiv:1602.07360, 2016, 9 pgs.

Ioffe et al., "Batch Normalization: Accelerating Deep Network Training by Reducing Internal Covariate Shift," arXiv:1502.03167, 2015, 11 pgs.

He et al., "Deep Residual Learning for Image Recognition," arXiv:1512.03385, 2015, 12 pgs.

Han et al., Deep Compression: Compressing Deep Neural Networks with Pruning, Trained Quantization and Huffman Coding, International Conference on Learning Representations 2016, 14 pgs.

Ernoult, Emeric, "How to Triple Your YouTube Video Views with Facebook", SocialMediaExaminer.com, Nov. 26, 2012, 16 pages.

* cited by examiner

SYSTEMS AND METHODS FOR ACCELERATING VIDEO ANALYSIS

FIELD

This disclosure relates to accelerating video analysis by using representative frames for similar portions of video.

BACKGROUND

The resources (time, processing, storage) necessary to perform video analysis may depend on the amount of video processed. Processing lengthy video may require large expenditure of resources.

SUMMARY

This disclosure relates to accelerating video analysis. Video information defining video content may be accessed. The video content may include video frames. The video frames may be grouped into similarity groups based on similarity of the video frames. The similarity groups may include a first similarity group including a first video frame and a second video frame. The first video frame may be similar to the second video frame. Representative video frames may be selected from the similarity groups. An individual representative video frame may correspond to an individual similarity group. Representative video frames may include a first representative video frame selected from and corresponding to the first similarity group. The video content may be analyzed based on the representative video frames.

A system that accelerates video analysis may include one or more processors, and/or other components. The processor(s) may be configured by machine-readable instructions. Executing the machine-readable instructions may cause the processor(s) to facilitate accelerating video analysis. The machine-readable instructions may include one or more computer program components. The computer program components may include one or more of a video information component, a group component, a video frame component, an analysis component, and/or other computer program components. In some implementations, the computer program components may include an encode component.

The video information component may be configured to access video information and/or other information. Accessing the video information may include one or more of acquiring, analyzing, determining, examining, locating, obtaining, receiving, retrieving, reviewing, storing, and/or otherwise accessing the video information. The video information may define video content and/or other information. The video content may include video frames. The video information component may access video information from one or more locations. The video information component may be configured to access video information defining video content during capture of the video content and/or after capture of the video content by one or more image sensors.

The group component may be configured to group some or all of the video frames into similarity groups based on similarity of the video frames, and/or other information. The similarity groups may include a first similarity group and/or other similarity groups. The first similarity group may include a first video frame, a second video frame, and/or other video frames. The first video frame may be similar to the second video frame. In some implementations, the group component may be configured to group some of all of the video frames into similarity groups further based on sequentiality of the video frames. The first video frame may be sequential with the second video frame.

In some implementations, grouping video frames into similarity groups may include extracting some or all of the video frames from the video content. In some implementations, the video content may be characterized by a framerate. The framerate may include a capture framerate, an encoded framerate, and/or other framerates. In some implementations, the video frames may be extracted from the video content at the framerate. In some implementations, the video frames may be extracted from the video content at a lower frame rate. For example, the video content may be characterized by a first framerate and the video frames may be extracted from the video content at a second framerate that is lower than the first frame rate.

Pairwise similarity of the extracted video frames may be determined. The video frames may be grouped into the similarity groups based on the determined pairwise similarity of the extracted video frames and/or other information.

In some implementations, grouping video frames into similarity groups may include determining similarity based on comparisons of feature vectors of pairs of video frames and/or other information. Feature vectors may include a first feature vector characterizing a local binary pattern distribution of the individual video frames and a second feature vector characterizing a color distribution of the individual video frames.

In some implementations, group component may be configured to downsample the video frames. The similarity of the video frames may be determined based on similarity of the downsampled video frames.

The video frame component may be configured to select representative video frames from the similarity groups. An individual representative video frame may correspond to an individual similarity group. The representative video frames may include a first representative video frame selected from and corresponding to the first similarity group.

The analysis component may be configured to analyze the video content based on the representative video frames and/or other information. The analysis of the video content based on the representative video frames may not individually analyze one or more portions of the video content between the representative video frames. In some implementations, the analysis of the video content may include at least one of object identification, facial identification, activity identification, and/or other analysis of visuals within the video content. In some implementations, the video content may be analyzed based on the representative video frames to identify the visuals within the video frames.

The encode component may be configured to determine encoding framerates for individual portions of the video content corresponding to the individual similarity groups. The encoding framerates may be determined based on the identified visuals within the corresponding representative video frames and/or other information.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not

DETAILED DESCRIPTION

Figure 1:
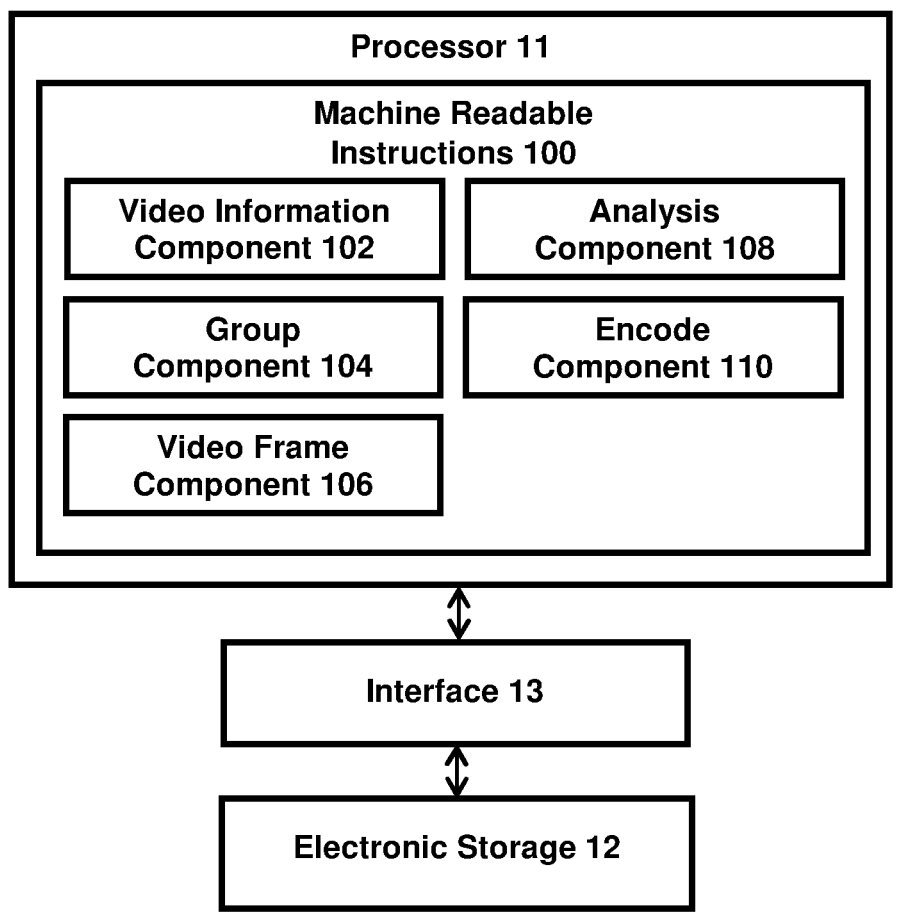
FIG. 1 illustrates a system that accelerates video analysis.

FIG. 1 illustrates a system 10 for accelerating video analysis. The system 10 may include one or more of a processor 11, an electronic storage 12, an interface 13 (e.g., bus, wireless interface), and/or other components. Video information defining video content may be accessed by the processor 11. The video content may include video frames. The video frames may be grouped into similarity groups based on similarity of the video frames. The similarity groups may include a first similarity group including a first video frame and a second video frame. The first video frame may be similar to the second video frame. Representative video frames may be selected from the similarity groups. An individual representative video frame may correspond to an individual similarity group. Representative video frames may include a first representative video frame selected from and corresponding to the first similarity group. The video content may be analyzed based on the representative video frames.

The electronic storage 12 may be configured to include electronic storage medium that electronically stores information. The electronic storage 12 may store software algorithms, information determined by the processor 11, information received remotely, and/or other information that enables the system 10 to function properly. For example, the electronic storage 12 may store information relating to video information, video content, video frames, similarity of video frames, sequentiality of video frames, similarity groups, representative video frames, video content analysis, video encoding, and/or other information.

Referring to FIG. 1, the processor 11 may be configured to provide information processing capabilities in the system 10. As such, the processor 11 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. The processor 11 may be configured to execute one or more machine readable instructions 100 to facilitate accelerating video analysis. The machine readable instructions 100 may include one or more computer program components. The machine readable instructions 100 may include one or more of a video information component 102, a group component 104, a video frame component 106, an analysis component 108, and/or other computer program components. In some implementations, the machine readable instructions 100 may include an encode component 110.

The video information component 102 may be configured to access video information and/or other information. Accessing the video information may include one or more of acquiring, analyzing, determining, examining, locating, obtaining, receiving, retrieving, reviewing, storing, and/or otherwise accessing the video information. The video information may define video and/or other information. The video content may include video frames.

The video information component 102 may access video information from one or more locations. For example, the video information component 102 may access the video information from a storage location, such as the electronic storage 12, electronic storage of information and/or signals generated by one or more image sensors (not shown in FIG. 1), electronic storage of a device accessible via a network, and/or other locations. The video information component 102 may access the video information from a hardware component (e.g., an image sensor) and/or a software component (e.g., software running on a computing device).

The video information component 102 may be configured to access video information defining video content during capture of the video content and/or after capture of the video content by one or more image sensors. For example, the video information component 102 may access video information defining video content while the video content is being captured by one or more image sensors. The video information component 102 may access video information defining video content after the video content has been captured and stored in memory (e.g., the electronic storage 12, buffer memory). In some implementations, the video information accessed by the video information component 102 may include raw video information generated from one or more image sensors' capture of the video content.

The group component 104 may be configured to group some or all of the video frames into similarity groups based on similarity of the video frames, and/or other information. Similarity of the video frames may be tracked using an inter-frame similarity metric and/or other information. The video frames of video content may be analyzed to determine the inter-frame similarity metric of the video frames. Video frames of certain similarity (e.g., as measured by the inter-frame similarity metric) may be grouped together into a similarity group. In some implementations, group component 104 may be configured to downsample the video frames. The similarity of the video frames may be determined using the downsampled video frames (e.g., based on similarity of the downsampled video frames).

The similarity groups may include a first similarity group and/or other similarity groups. The first similarity group may include a first video frame, a second video frame, and/or other video frames. The first video frame may be similar to the second video frame and/or other video frames within the first similarity group. The first video frame may be similar in visual content to the second video frame and/or other video frames within the first similarity group. In some implementations, the group component 104 may be configured to group some of all of the video frames into similarity groups further based on sequentiality of the video frames. The first video frame may be sequential with the second video frame.

Figure 3:
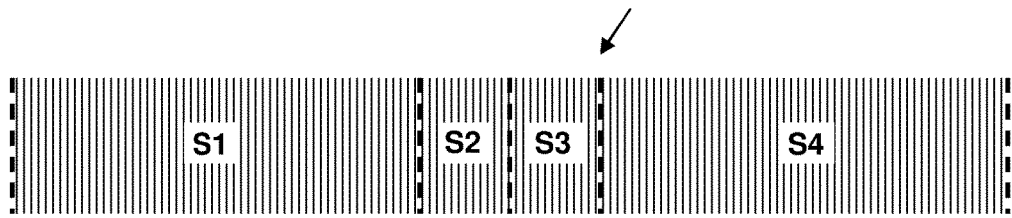
FIG. 3 illustrates example grouping of video frames based on similarity.

For example, FIG. 3 illustrates video frames 300 of video content. The video frames 300 may be analyzed to determine similarity between the video frames 300. The group component 104 may group the video frames 300 into four similarity groups: S1, S2, S3, and S4. The video frames within the similarity group S1 may be similar to each other, the video frames within the similarity group S2 may be similar to each other, the video frames within the similarity group S3 may be similar to each other, and the video frames within the similarity group S4 may be similar to each other.

Figure 4:
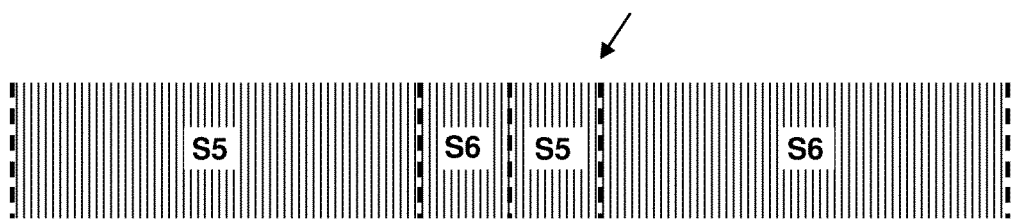
FIG. 4 illustrates example grouping of video frames based on similarity.

In some implementations, a similarity group may include discontinuous video frames/video portions. For example, referring to FIG. 4, the group component 104 may group the video frames 400 into two similarity groups: S5 and S6. The video frames within the similarity group S5 may be similar to each other, and the video frames within the similarity group S6 may be similar to each other. The similarity groups S5 and S6 may span discontinuous portions of the video content.

In some implementations, grouping video frames into similarity groups may include determining similarity of the video frames based on comparisons of feature vectors of pairs of video frames and/or other information. Feature vectors may include a first feature vector characterizing a local binary pattern distribution of the individual video frames, a second feature vector characterizing a color distribution of the individual video frames, and/or other feature vectors. The group component 104 may determine pairwise similarity of the video frames, and group the video frames into the similarity groups based on the determined pairwise similarity of the video frames.

For example, the video frames 300 may include video frames L1, L2, L3, L4, and/or other video frames. Feature vectors of pairs of the video frames 300 may be compared such that feature vectors of L1 and L2 are compared, feature vectors of L2 and L3 are compared, feature vectors of L3 and L4 are compared, and so forth. A feature vector comparison may include a function that compares two feature vectors of separate images and returns a Boolean (e.g., one or more thresholds are applied to determine whether the images are "similar" or "not similar"). One or more thresholds used in a feature vector comparison may be set or may be changed. For example, one or more thresholds may be determined based on user input. In some implementations, similarity of the video frames be determined by using systems and/or methods described in U.S. patent application Ser. No. 14/920,375, entitled "SYSTEMS AND METHODS FOR IDENTIFYING A GROUP OF IMAGES," filed Oct. 22, 2015, the foregoing being incorporated herein by reference in its entirety.

In some implementations, grouping video frames into similarity groups may include extracting some or all of the video frames from the video content. The video content may be characterized by one or more framerates. The framerate(s) may include a capture framerate, an encoded framerate, and/or other framerates. In some implementations, the video frames may be extracted from the video content at the same rate as the capture framerate or the encoded framerate. In some implementations, the video frames may be extracted from the video content at a lower rate than the capture frame rate or the encoded framerate. For example, the video content may be characterized by a capture/encoded framerate of 120 frames/second and the video frames may be extracted from the video content at a framerate that is lower than 120 frames/second.

Pairwise similarity of the extracted video frames may be determined. The video frames may be grouped into the similarity groups based on the determined pairwise similarity of the extracted video frames and/or other information.

The video frame component 106 may be configured to select representative video frames from the similarity groups. An individual representative video frame may correspond to an individual similarity group. Representative video frames may be chosen from individual similarity groups randomly, based on a selection policy, and/or other information. For example, the video frame component 106 may be configured to select one or more of the video frames from a similarity group at random for use as the representative video frame(s). The video frame component 106 may be configured to select one or more particular video frames (e.g., first video frame, last video frame, middle video frame, video frame a certain frame number/duration away from another frame/point) from a similarity group for use as the representative video frame(s).

Figure 5:
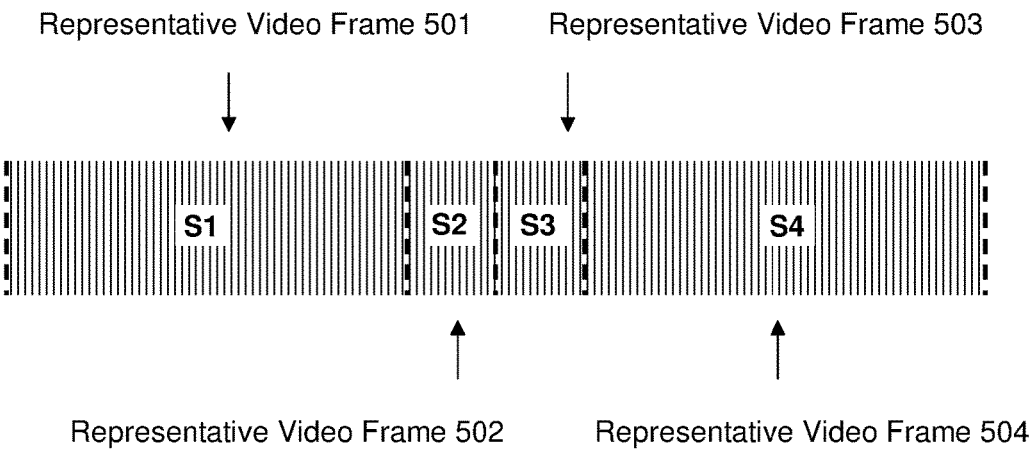
FIG. 5 illustrates example representative video frames.
Figure 6:
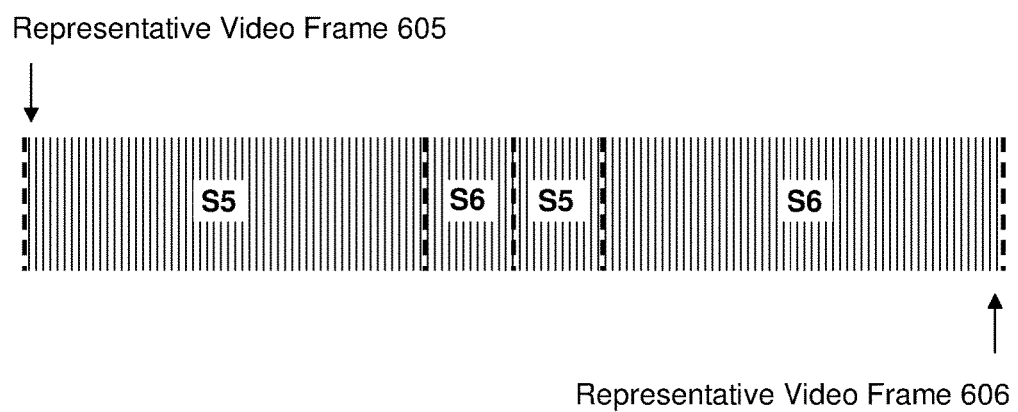
FIG. 6 illustrates example representative video frames.

For example, referring to FIG. 5, the representative video frames may include a representative video frame 501 corresponding to the similarity group S1, a representative video frame 502 corresponding to the similarity group S2, a representative video frame 503 corresponding to the similarity group S3, and a representative video frame 504 corresponding to the similarity group S4. Referring to FIG. 6, the representative video frames may include a representative video frame 605 corresponding to the similarity group S5, and a representative video frame 606 corresponding to the similarity group S6. Other selections of representative video frames are contemplated.

The analysis component 108 may be configured to analyze the video content based on the representative video frames and/or other information. The analysis of the video content based on the representative video frames may not individually analyze one or more portions of the video content between the representative video frames. For example, referring to FIG. 5, the analysis component 108 may analyze the video content based on the representative video frames 501, 502, 503, 504. The analysis of the video content may not individually analyze one or more portions (e.g., video frames) of the video content between the representative video frame 501 and the representative video frame 502, between the representative video frame 502 and the representative video frame 503, and between the representative video frame 503 and the representative video frame 504. The analysis of the video content may not individually analyze one or more portions (e.g., video frames) of the video content before the representative video frame 501, and after the representative video frame 504. Referring to FIG. 6, the analysis component 108 may analyze the video content based on the representative video frame 605 and the representative video frame 606. The analysis of the video content may not individually analyze one or more portions (e.g., video frames) of the video content between the representative video frame 605 and the representative video frame 606.

The analysis of video content based on the representative video frames may provide for analysis of the video content using a non-fixed sampling rate. Video content may be analyzed using representative video frames located at non-evenly spaced positions within the video content. For example, rather than analyzing a given video content using a fixed sampling interval (e.g., sampling every 60th frames), the given video content may be analyzed using the 14th, 100th, 900th, 906th, and 1000th video frames.

Analysis of the video content may include examination of the visual, audio, and/or other information contained within the video content. In some implementations, the analysis of the video content may include one or more of object identification, facial identification, activity identification, and/or other analysis of visuals, audio, other information within the video content. In some implementations, the video content may be analyzed based on the representative video frames to identify the visuals within the video frames.

Performing analysis of the video content based on the representative video frames may accelerate processing of video analysis by not individually analyzing (e.g., skipping) one or more spans of the video content where pairwise similarity is high. Rather than analyzing individual video frames of the video content or analyzing the video frames using a certain sample rate, the analysis component 108 may be able to analyze the video content using the representative video frames.

In some implementations, it may be desirable to use different sample rates to analyze video content including different footage. For example, it may be generally desirable to analyze video content including skiing footage at a lower sample rate than video content including surfing footage (e.g., based on expected movements, lighting, environmental conditions). However, different moments within the skiing footage may require different sample rates for proper analysis. For example, certain moments within the skiing footage may require higher sample rate than the sample rate that might be recommended in general for the surfing footage. Rather than setting a single/static sample rate for analyses of the video content (e.g., based on the activity captured within the video content), the systems and methods disclosed herein enables the use of non-fixed sampling of video frames for analysis which takes into account the visual characteristics of the video content/video frames.

The encode component 110 may be configured to determine encoding framerates for individual portions of the video content corresponding to the individual similarity groups. The encoding framerates may be determined based on the identified visuals within the corresponding representative video frames and/or other information. For example, referring to FIG. 6, the encode component 110 may determine encoding framerate(s) for individual portions of the video content corresponding to the similarity group S5 and encoding framerate(s) for individual portions of the video content corresponding to the similarity group S6. Based on analysis of the representative video frame 605, the encode component 110 may determine the encoding framerate(s) for the portions of the video content corresponding to the similarity group S5. Based on analysis of the representative video frame 606, the encode component 110 may determine the encoding framerate(s) for the portions of the video content corresponding to the similarity group S6. Thus, the encode component 110 may determine encoding framerates for individual portions of the video content without individually analyzing one or more portions of the video content between the representative video frames.

In some implementations, video content may include one or more of spherical video content, virtual reality content, and/or other video content. Spherical video content and/or virtual reality content may define visual content viewable from one or more points of view as a function of progress through the spherical/virtual reality video content.

Spherical video content may refer to a video capture of multiple views from a single location. Spherical video content may include a full spherical video capture (360 degrees of capture) or a partial spherical video capture (less than 360 degrees of capture). Spherical video content may be captured through the use of one or more cameras/image sensors to capture images/videos from a location. The captured images/videos may be stitched together to form the spherical video content.

Virtual reality content may refer to content that may be consumed via virtual reality experience. Virtual reality content may associate different directions within the virtual reality content with different viewing directions, and a user may view a particular directions within the virtual reality content by looking in a particular direction. For example, a user may use a virtual reality headset to change the user's direction of view. The user's direction of view may correspond to a particular direction of view within the virtual reality content. For example, a forward looking direction of view for a user may correspond to a forward direction of view within the virtual reality content.

Spherical video content and/or virtual reality content may have been captured at one or more locations. For example, spherical video content and/or virtual reality content may have been captured from a stationary position (e.g., a seat in a stadium). Spherical video content and/or virtual reality content may have been captured from a moving position (e.g., a moving bike). Spherical video content and/or virtual reality content may include video capture from a path taken by the capturing device(s) in the moving position. For example, spherical video content and/or virtual reality content may include video capture from a person walking around in a music festival.

While the description herein may be directed to video content, one or more other implementations of the system/method described herein may be configured for other types media content. Other types of media content may include one or more of audio content (e.g., music, podcasts, audio books, and/or other audio content), multimedia presentations, images, slideshows, visual content (one or more images and/or videos), and/or other media content.

Implementations of the disclosure may be made in hardware, firmware, software, or any suitable combination thereof. Aspects of the disclosure may be implemented as instructions stored on a machine-readable medium, which may be read and executed by one or more processors. A machine-readable medium may include any mechanism for storing or transmitting information in a form readable by a machine (e.g., a computing device). For example, a tangible computer readable storage medium may include read only memory, random access memory, magnetic disk storage media, optical storage media, flash memory devices, and others, and a machine-readable transmission media may include forms of propagated signals, such as carrier waves, infrared signals, digital signals, and others. Firmware, software, routines, or instructions may be described herein in terms of specific exemplary aspects and implementations of the disclosure, and performing certain actions.

Although processor 11 and electronic storage 12 are shown to be connected to interface 13 in FIG. 1, any communication medium may be used to facilitate interaction between any components of system 10. One or more components of system 10 may communicate with each other through hard-wired communication, wireless communication, or both. For example, one or more components of system 10 may communicate with each other through a network. For example, processor 11 may wirelessly communicate with electronic storage 12. By way of non-limiting example, wireless communication may include one or more of radio communication, Bluetooth communication, Wi-Fi communication, cellular communication, infrared communication, or other wireless communication. Other types of communications are contemplated by the present disclosure.

Although the processor 11 is shown in FIG. 1 as a single entity, this is for illustrative purposes only. In some implementations, the processor 11 may comprise a plurality of processing units. These processing units may be physically located within the same device, or the processor 11 may represent processing functionality of a plurality of devices operating in coordination. The processor 11 may be configured to execute one or more components by software; hardware; firmware; some combination of software, hardware, and/or firmware; and/or other mechanisms for configuring processing capabilities on the processor 11.

It should be appreciated that although computer components are illustrated in FIG. 1 as being co-located within a single processing unit, in implementations in which the processor 11 comprises multiple processing units, one or more of computer program components may be located remotely from the other computer program components.

While the computer program components are described herein as being implemented via processor 11 through machine readable instructions 100, this is merely for ease of reference and is not meant to be limiting. In some implementations, one or more functions of computer program components described herein may be implemented via hardware (e.g., dedicated chip, field-programmable gate array) rather than software. One or more functions of computer program components described herein may be software-implemented, hardware-implemented, or software and hardware-implemented.

The description of the functionality provided by the different computer program components described herein is for illustrative purposes, and is not intended to be limiting, as any of computer program components may provide more or less functionality than is described. For example, one or more of computer program components may be eliminated, and some or all of its functionality may be provided by other computer program components. As another example, the processor 11 may be configured to execute one or more additional computer program components that may perform some or all of the functionality attributed to one or more of computer program components described herein.

In some implementations, some or all of the functionalities attributed herein to the system 10 may be provided by external resources not included in the system 10. External resources may include hosts/sources of information, computing, and/or processing and/or other providers of information, computing, and/or processing outside of the system 10.

The electronic storage media of the electronic storage 12 may be provided integrally (i.e., substantially non-removable) with one or more components of the system 10 and/or removable storage that is connectable to one or more components of the system 10 via, for example, a port (e.g., a USB port, a Firewire port, etc.) or a drive (e.g., a disk drive, etc.). The electronic storage 12 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. The electronic storage 12 may be a separate component within the system 10, or the electronic storage 12 may be provided integrally with one or more other components of the system 10 (e.g., the processor 11). Although the electronic storage 12 is shown in FIG. 1 as a single entity, this is for illustrative purposes only. In some implementations, the electronic storage 12 may comprise a plurality of storage units. These storage units may be physically located within the same device, or the electronic storage 12 may represent storage functionality of a plurality of devices operating in coordination.

Figure 2:
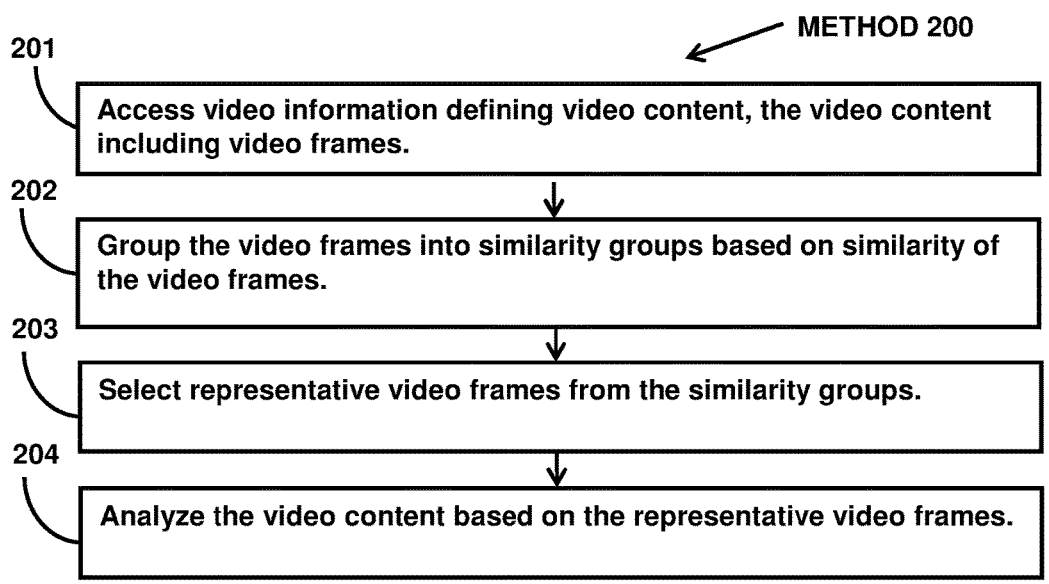
FIG. 2 illustrates a method for accelerates video analysis.

FIG. 2 illustrates method 200 for accelerating video analysis. The operations of method 200 presented below are intended to be illustrative. In some implementations, method 200 may be accomplished with one or more additional operations not described, and/or without one or more of the operations discussed. In some implementations, two or more of the operations may occur substantially simultaneously.

In some implementations, method 200 may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operation of method 200 in response to instructions stored electronically on one or more electronic storage mediums. The one or more processing devices may include one or more devices configured through hardware, firmware, and/or software to be specifically designed for execution of one or more of the operation of method 200.

Referring to FIG. 2 and method 200, at operation 201, video information defining video content may be accessed. The video content may include video frames. In some implementation, operation 201 may be performed by a processor component the same as or similar to the video information component 102 (Shown in FIG. 1 and described herein).

At operation 202, the video frames may be grouped into similarity groups based on similarity of the video frames. The similarity groups may include a first similarity group and/or other similarity groups. The first similarity group may include a first video frame, a second video frame, and/or other video frames. The first video frame may be similar to the second video frame. In some implementations, operation 202 may be performed by a processor component the same as or similar to the group component 104 (Shown in FIG. 1 and described herein).

At operation 203, representative video frames may be selected from the similarity groups. An individual representative video frame may correspond to an individual similarity group. Representative video frames may include a first representative video frame selected from and corresponding to the first similarity group. In some implementations, operation 203 may be performed by a processor component the same as or similar to the video frame component 106 (Shown in FIG. 1 and described herein).

At operation 204, the video content may be analyzed based on the representative video frames and/or other information. In some implementations, operation 204 may be performed by a processor component the same as or similar to the analysis component 108 (Shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system that accelerates video analysis, the system comprising:
one or more physical processors configured by machine readable instruction to:

access video information defining video content, the video content including video frames;

group the video frames into similarity groups based on similarity of the video frames, the similarity groups including a first similarity group including a first video frame and a second video frame, the first video frame similar to the second video frame;

select representative video frames from the similarity groups, an individual representative video frame corresponding to an individual similarity group, wherein the representative video frames include a first representative video frame selected from and corresponding to the first similarity group, the first representative video frame being the first video frame;

analyze the video content based on analysis of the representative video frames to identify visuals within the representative video frames, the identified visuals within the representative video frames representative of visuals within the corresponding similarity groups, wherein visuals within the first similarity group is identified based on analysis of the first video frame and without analysis of the second video frame, the identified visuals within the first video frame being representative of the visuals within the first similarity group; and determine encoding framerates for individual portions of the video content corresponding to the individual similarity groups based on the identified visuals within the corresponding representative video frames such that a first encoding framerate for a first portion of the video content corresponding to the first similarity group is determined based on the identified visuals within the first video frame, wherein the first portion of the video content corresponding to the first similarity group is encoded using the first encoding framerate.

2. The system of claim 1, wherein the one or more physical processors are, to group the video frames into the similarity groups, further configured by the machine-readable instruction to:

extract some or all of the video frames from the video content;

determine pairwise similarity of the extracted video frames; and group the video frames into the similarity groups based on the determined pairwise similarity of the extracted video frames.

3. The system of claim 2, wherein the video content is characterized by a framerate and the video frames are extracted from the video content at the framerate.

4. The system of claim 2, wherein the video content is characterized by a first framerate and the video frames are extracted from the video content at a second framerate, the second framerate lower than the first framerate.

5. The system of claim 1, wherein the video frames are grouped into the similarity groups further based on sequentiality of the video frames, the first video frame sequential with the second video frames.

6. The system of claim 1, wherein grouping the video frames into the similarity groups includes determining the similarity based on comparisons of feature vectors of pairs of the video frames, the feature vectors including a first feature vector characterizing a local binary pattern distribution of the individual video frames and a second feature vector characterizing a color distribution of the individual video frames.

7. The system of claim 1, wherein the one or more physical processors are further configured by machine-readable instructions to downsample the video frames, the similarity of the video frames determined based on similarity of the downsampled video frames.

8. The system of claim 1, wherein the analysis of the video content includes at least one of object identification, facial identification, or activity identification of visuals within the video content.

9. The system of claim 1, wherein the video content includes a first segment, a second segment, and a third segment, the second segment located between the first segment and the third segment, and the first similarity group includes non-continuous segments of the video content such that the first similarity group includes the first segment and the third segment and does not include the second segment.

10. A method for accelerating video analysis, the method performed by a computing system including one or more physical processors, the method comprising:

accessing, by the one or more physical processors, video information defining video content, the video content including video frames;

grouping, by the one or more physical processors, the video frames into similarity groups based on similarity of the video frames, the similarity groups including a first similarity group including a first video frame and a second video frame, the first video frame similar to the second video frame;

selecting, by the one or more physical processors, representative video frames from the similarity groups, an individual representative video frame corresponding to an individual similarity group, wherein the representative video frames include a first representative video frame selected from and corresponding to the first similarity group, the first representative video frame being the first video frame;

analyzing, by the one or more physical processors, the video content based on analysis of the representative video frames to identify visuals within the representative video frames, the identified visuals within the representative video frames representative of visuals within the corresponding similarity groups, wherein visuals within the first similarity group is identified based on analysis of the first video frame and without analysis of the second video frame, the identified visuals within the first video frame being representative of the visuals within the first similarity group; and determining, by the one or more physical processors, encoding framerates for individual portions of the video content corresponding to the individual similarity groups based on the identified visuals within the corresponding representative video frames such that a first encoding framerate for a first portion of the video content corresponding to the first similarity group is determined based on the identified visuals within the first video frame, wherein the first portion of the video content corresponding to the first similarity group is encoded using the first encoding framerate.

11. The method of claim 10, wherein grouping the video frames into the similarity groups includes:

extracting some or all of the video frames from the video content;

determining pairwise similarity of the extracted video frames; and grouping the video frames into the similarity groups based on the determined pairwise similarity of the extracted video frames.

12. The method of claim 11, wherein the video content is characterized by a framerate and the video frames are extracted from the video content at the framerate.

13. The method of claim 11, wherein the video content is characterized by a first framerate and the video frames are extracted from the video content at a second framerate, the second framerate lower than the first framerate.

14. The method of claim 12, wherein the video frames are grouped into the similarity groups further based on sequentiality of the video frames, the first video frame sequential with the second video frames.

15. The method of claim 10, wherein grouping the video frames into the similarity groups includes determining the similarity based on comparisons of feature vectors of pairs of the video frames, the feature vectors including a first feature vector characterizing a local binary pattern distribution of the individual video frames and a second feature vector characterizing a color distribution of the individual video frames.

16. The method of claim 10, further comprising downsampling the video frames, the similarity of the video frames determined based on similarity of the downsampled video frames.

17. The method of claim 10, wherein the analysis of the video content includes at least one of object identification, facial identification, or activity identification of visuals within the video content.

18. The method of claim 10, wherein the video content includes a first segment, a second segment, and a third segment, the second segment located between the first segment and the third segment, and the first similarity group includes non-continuous segments of the video content such that the first similarity group includes the first segment and the third segment and does not include the second segment.

19. A system that accelerates video analysis, the system comprising:
one or more physical processors configured by machine readable instruction to:
access video information defining video content, the video content including video frames;
extract the video frames from the video content, wherein the video content is characterized by a first framerate and the video frames are extracted from the video content at the first framerate or a second framerate lower than the first framerate;
group the video frames into similarity groups based on similarity of the video frames, the similarity groups including a first similarity group including a first video frame and a second video frame, the first video frame similar to the second video frame, wherein the one or more physical processors are, to group the video frames into the similarity groups, further configured by the machine-readable instruction to:
extract some or all of the video frames from the video content;
determine pairwise similarity of the extracted video frames; and
group the video frames into the similarity groups based on the determined pairwise similarity of the extracted video frames;
select representative video frames from the similarity groups, an individual representative video frame corresponding to an individual similarity group, wherein the representative video frames include a first representative video frame selected from and corresponding to the first similarity group, the first representative video frame being the first video frame;
analyze the video content based on analysis of the representative video frames to identify visuals within the representative video frames, the identified visuals within the representative video frames representative of visuals within the corresponding similarity groups, wherein visuals within the first similarity group is identified based on analysis of the first video frame and without analysis of the second video frame, the identified visuals within the first video frame being representative of the visuals within the first similarity group; and
determine encoding framerates for individual portions of the video content corresponding to the individual similarity groups based on the identified visuals within the corresponding representative video frames such that a first encoding framerate for a first portion of the video content corresponding to the first similarity group is determined based on the identified visuals within the first video frame, wherein the first portion of the video content corresponding to the first similarity group is encoded using the first encoding framerate.

20. The system of claim 19, wherein the video content includes a first segment, a second segment, and a third segment, the second segment located between the first segment and the third segment, and the first similarity group includes non-continuous segments of the video content such that the first similarity group includes the first segment and the third segment and does not include the second segment.

* * * * *